(12) United States Patent
Smith

(10) Patent No.: US 10,357,026 B2
(45) Date of Patent: Jul. 23, 2019

(54) LURE WITH INTERACTING SPINNERS

(71) Applicant: Johnny L Smith, Linneus, MO (US)

(72) Inventor: Johnny L Smith, Linneus, MO (US)

(*) Notice: Subject to any disclaimer, the term of this patent is extended or adjusted under 35 U.S.C. 154(b) by 337 days.

(21) Appl. No.: 15/163,246

(22) Filed: May 24, 2016

(65) Prior Publication Data

US 2017/0339933 A1 Nov. 30, 2017

(51) Int. Cl.
*A01K 85/10* (2006.01)
*A01K 85/01* (2006.01)
*A01K 85/00* (2006.01)

(52) U.S. Cl.
CPC .............. *A01K 85/10* (2013.01); *A01K 85/00* (2013.01); *A01K 85/01* (2013.01)

(58) Field of Classification Search
CPC ......... A01K 85/00; A01K 85/01; A01K 85/10
USPC ............ 43/42.11, 42.13, 42.14, 42.19, 42.31
See application file for complete search history.

(56) References Cited

U.S. PATENT DOCUMENTS

| | | | |
|---|---|---|---|
| 1,295,617 A | 2/1919 | Shannon | |
| 1,997,802 A * | 4/1935 | Meyer | A01K 85/14 43/42.13 |
| 2,755,593 A * | 7/1956 | Thurman | A01K 83/06 43/42.13 |
| 2,756,532 A * | 7/1956 | Trester | A01K 85/08 43/42.05 |
| 2,999,330 A * | 9/1961 | Sich, Jr. | A01K 85/10 43/42.17 |
| 3,257,750 A | 6/1966 | Shannon | |
| 3,775,892 A * | 12/1973 | Bennetts | A01K 85/10 43/42.14 |
| 4,003,154 A * | 1/1977 | Carver | A01K 85/00 43/42.09 |
| 4,011,681 A * | 3/1977 | Johnson | A01K 85/00 43/42.11 |
| 4,209,932 A * | 7/1980 | Pate | A01K 85/00 43/42.11 |
| 4,536,986 A * | 8/1985 | Stout | A01K 85/00 43/42.11 |
| 4,571,877 A | 2/1986 | Montgomery | |
| 4,625,448 A * | 12/1986 | Borders | A01K 85/00 43/42.11 |
| 4,640,041 A * | 2/1987 | Stanley | A01K 85/00 43/42.13 |
| 4,773,180 A * | 9/1988 | Shimizu | A01K 85/00 43/42.11 |

(Continued)

OTHER PUBLICATIONS

Webpage; Spinnerbait with tandem blade configuration; May 14, 2007.

*Primary Examiner* — Darren W Ark
*Assistant Examiner* — Brady W Frazier
(74) *Attorney, Agent, or Firm* — Erickson Kernell IP, LLC; John C. McMahon

(57) ABSTRACT

A fishing lure apparatus includes a lure structure or frame with a hook and a first spinner blade retained on a connector member rotatably connected to the frame for spinning when the lure is drawn through water and a second spinner blade retained on the same connector member whereby the second blade periodically engages the first blade when the lure apparatus is drawn through water to thereby affect spinning motion of the first spinner blade. Engagement of the first and second spinner members may create noise or currents in water, in addition to a visual appearance, to attract fish.

22 Claims, 2 Drawing Sheets

(56) References Cited

U.S. PATENT DOCUMENTS

| | | | | |
|---|---|---|---|---|
| 4,793,089 A * | 12/1988 | Long | A01K 85/00 | 43/42.13 |
| 4,888,908 A * | 12/1989 | Morris | A01K 85/00 | 43/42.14 |
| 4,901,470 A * | 2/1990 | Gentry | A01K 85/00 | 43/42.13 |
| 4,962,610 A * | 10/1990 | Bleam | A01K 85/14 | 43/42.5 |
| 5,355,612 A * | 10/1994 | Smith | A01K 85/00 | 43/42.11 |
| 5,412,899 A * | 5/1995 | Reboul | A01K 85/00 | 43/42.11 |
| 5,499,470 A * | 3/1996 | Reed | A01K 85/00 | 43/42.06 |
| 5,605,004 A * | 2/1997 | Boullt | A01K 85/00 | 43/42.13 |
| 6,041,538 A * | 3/2000 | Roemer | A01K 85/00 | 43/42.06 |
| 6,112,451 A * | 9/2000 | Webb | A01K 85/00 | 43/42.06 |
| 6,266,914 B1 * | 7/2001 | Johnson | A01K 85/00 | 43/42.13 |
| 6,701,662 B1 * | 3/2004 | Moore | A01K 85/00 | 43/42.11 |
| 7,437,849 B2 * | 10/2008 | Selvaggio | A01K 85/00 | 43/42.05 |
| 8,042,298 B1 * | 10/2011 | Yonekura | A01K 85/00 | 43/42.13 |
| 2002/0148155 A1 * | 10/2002 | Pasley | A01K 85/10 | 43/42.49 |
| 2003/0019146 A1 * | 1/2003 | McNally | A01K 85/00 | 43/42.13 |
| 2004/0123510 A1 * | 7/2004 | Essad | A01K 85/00 | 43/42.13 |
| 2005/0039373 A1 * | 2/2005 | Essad | A01K 85/14 | 43/42.11 |
| 2006/0005458 A1 * | 1/2006 | Maki | A01K 85/00 | 43/42.13 |
| 2006/0048439 A1 * | 3/2006 | Usui | A01K 85/14 | 43/42.11 |
| 2007/0169398 A1 * | 7/2007 | Taszarek | A01K 85/10 | 43/42.19 |
| 2009/0172993 A1 * | 7/2009 | Willis | A01K 85/00 | 43/42.28 |
| 2010/0263258 A1 * | 10/2010 | Hinz | A01K 85/00 | 43/42.13 |
| 2010/0281756 A1 * | 11/2010 | Lau | A01K 85/00 | 43/42.13 |
| 2011/0247260 A1 * | 10/2011 | Schwartz | A01K 85/01 | 43/42.31 |

* cited by examiner

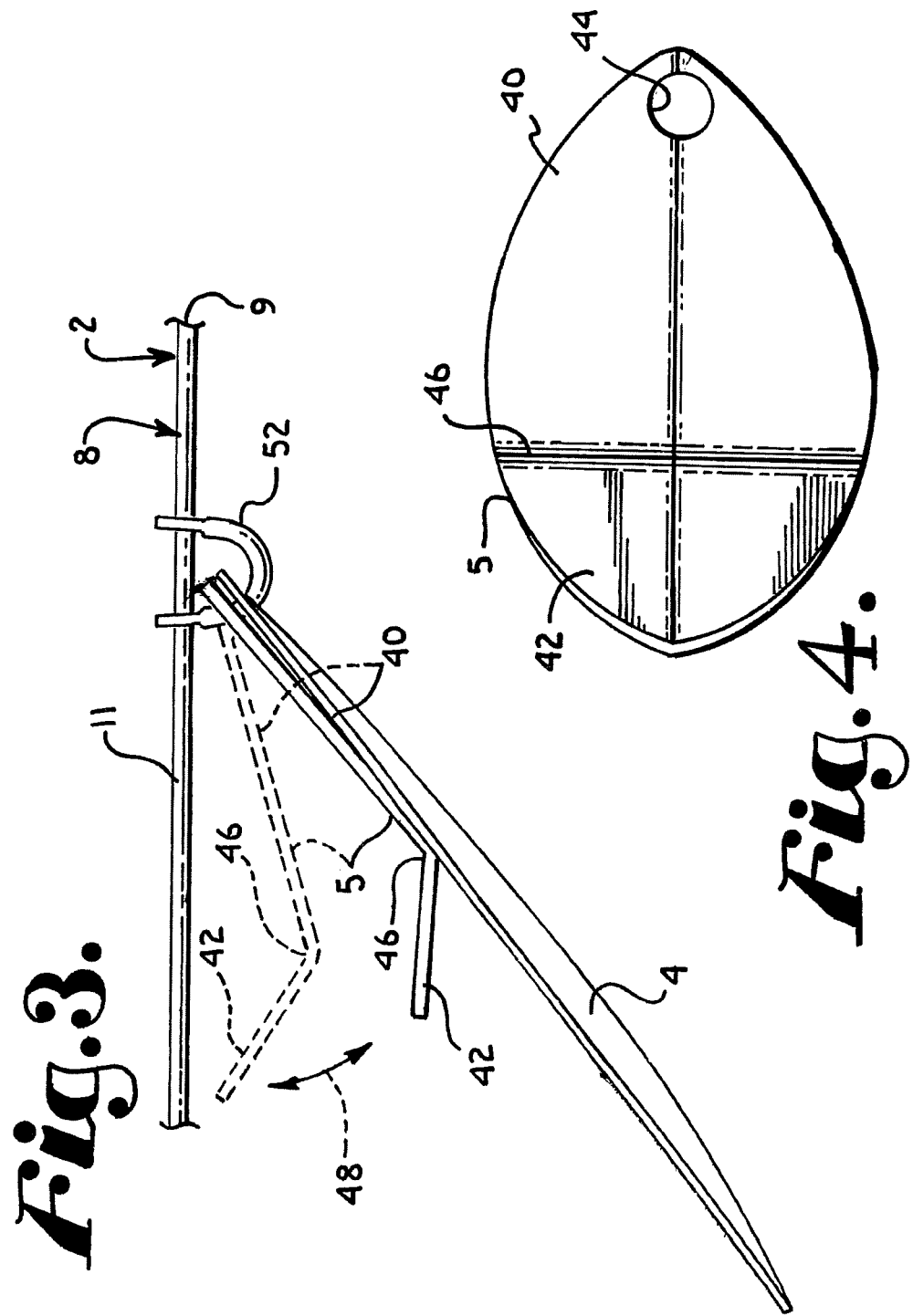

LURE WITH INTERACTING SPINNERS

BACKGROUND OF THE INVENTION

The present invention is broadly concerned with improvements in equipment for fishing and, more particularly, with improvements in spinnerbait types of fishing lures.

Fishing is an ancient practice which is principally pursued to provide food for human consumption. Commercial fishing gathers large numbers of fish at a time, usually by drawing nets through schools or other groups of fish. In recreational or sport fishing, the aim is to entice a single fish at a time to strike at, and get snagged by, a hook. The hooked fish may then be harvested for consumption or unhooked and released alive. Typically, a hook is embedded into or through live or food baits or attached to artificial lures to motivate a fish to strike or bite at the bait or lure and, thus, become hooked.

Fishing lures are designed to attract a fish's attention by the use of movement, vibration, flash, appearance, and color. Many lures are equipped with one or more hooks that are used to catch fish when they strike the lure. Most lures are attached to the end of a fishing line and have various styles of hooks attached to the body or frame and are designed to elicit a strike by a fish. Various types of lures have been used since ancient times.

A particular type of lure is referred to as a spinnerbait. The term spinnerbait encompasses a family of fishing lures that employ one or more metal blades shaped to spin when the lure is in relative motion to water, creating varying degrees of flash, water currents, and vibration that mimic small fish or other prey. Spinnerbaits attract predatory fish primarily by activating a special sense organ called the lateral line system by the action of the spinning blade. The lateral line is a system of sense organs found in many aquatic vertebrates which are used to detect movement and vibration in the surrounding water. The lateral line system allows the detection of movement and vibrations in the water surrounding an animal, providing spatial awareness and the ability to navigate in space. This plays an essential role in orientation, predatory behavior, and social schooling. Spinnerbaits can also stimulate other senses of fish, such as sight, to mimic prey by creating flashes in the water.

A common type of spinnerbait lure is referred to as a "safety-pin" or overhead blade spinnerbait. A safety-pin spinnerbait includes a framework formed by a spring wire bent to form upper and lower legs at an angle of about 60 to 90 degrees. The lower leg has a weighted hook secured thereto, with a barb of the hook oriented upwardly. A lead weight is positioned at an end of the hook opposite the hook and may have an image of an eye applied thereto to give the arrangement the look of a fish. The hook may be surrounded by a skirt formed of flexible fringes, feathers, or the like. The upper leg of the frame has a spinner blade connected thereto, usually by a swivel, to enable the spinner to spin freely as the lure is drawn through water. The spinner blade is typically convex/concave and often has a teardrop shape. A fishing line is tied to the lure at the vertex between the upper and lower legs of the wire. The weight of the weighted hook side of the hook exceeds that of the spinner blade side of the lure such that, when in water, the hook side assumes a lower position with the spinner blade above.

SUMMARY OF THE INVENTION

The present invention provides embodiments of an improved spinnerbait lure apparatus. In general, the apparatus of the present invention provides a spinnerbait lure having spinner blades thereon which are configured and mounted in such a manner that they interact when the lure is drawn through water.

An embodiment of the lure apparatus includes a lure structure or frame, a first spinner member connected to the lure frame to enable spinning motion thereof when the lure apparatus is drawn through water, and a second spinner member connected to the lure frame in spaced relation to the first spinner whereby movement of the second spinner when the lure apparatus is drawn through water affects the spinning motion of the first spinner member. The apparatus may include a connector member rotatably connected to the lure frame in such a manner as to enable rotation of the connector relative to the lure frame, and the first spinner member and the second spinner member are retained on the connector member and rotate therewith. The connector member may include a swivel to facilitate spinning the first and second spinner members. Alternatively, the connector member may include a clevis.

In an embodiment of the lure apparatus of the present invention, the second spinner member is positioned on the lure frame in such a manner relative to the first spinner member as to periodically engage the first spinner member when the lure apparatus is drawn through water. Such engagement of the first and second spinner members affect the spinning motion of the first spinner member and create noise and vibrating currents in the water as the lure apparatus is drawn therethrough.

In an embodiment of the lure apparatus, the second spinner member is angularly bent to form an inner spinner segment and a outer spinner segment, the inner spinner segment being connected to the lure frame. The outer spinner segment may be positioned at a bend angle within an angular range of 90 to 170 degrees relative to the inner spinner segment. Ordinarily, the angular range may be about 120 to 150 degrees. The first spinner member has curvature in a three-dimensional space and has a convex side and an opposite concave side. In an embodiment of the apparatus, the second spinner member is positioned on the concave side of the first spinner member with the outer segment angled away from the first spinner member. In such an orientation, impingement of water with the outer spinner segment causes the second spinner member to be driven toward the first spinner member, as the lure apparatus is drawn through water, thereby "kicking" or engaging the first spinner member creating noise and currents in the water and affecting the spinning motion of the first spinner member.

The body or frame of the lure apparatus may be in the form of a resilient wire bent at a desired angle, such as from 60 to 90 degrees to form upper and lower legs. The lower leg may have a weighted hook joined thereto and may include a skirt of fringed material or filaments. The weight and skirt may give the lower leg the look of a type of fish to thereby lure a predator to strike the apparatus. The upper leg has the first and second spinner members connected thereto to enable spinning motion, such as by a swivel or a clevis. A fishing line may be tied to the wire at a vertex between the upper and lower legs.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a greatly enlarged side elevational view of interacting spinner blades according to the present invention, shown connected to a wire component by a clevis.

FIG. 4 is a further enlarged outer plan view of an angled spinner blade according to the present invention.

DETAILED DESCRIPTION OF THE INVENTION

Figure 1:
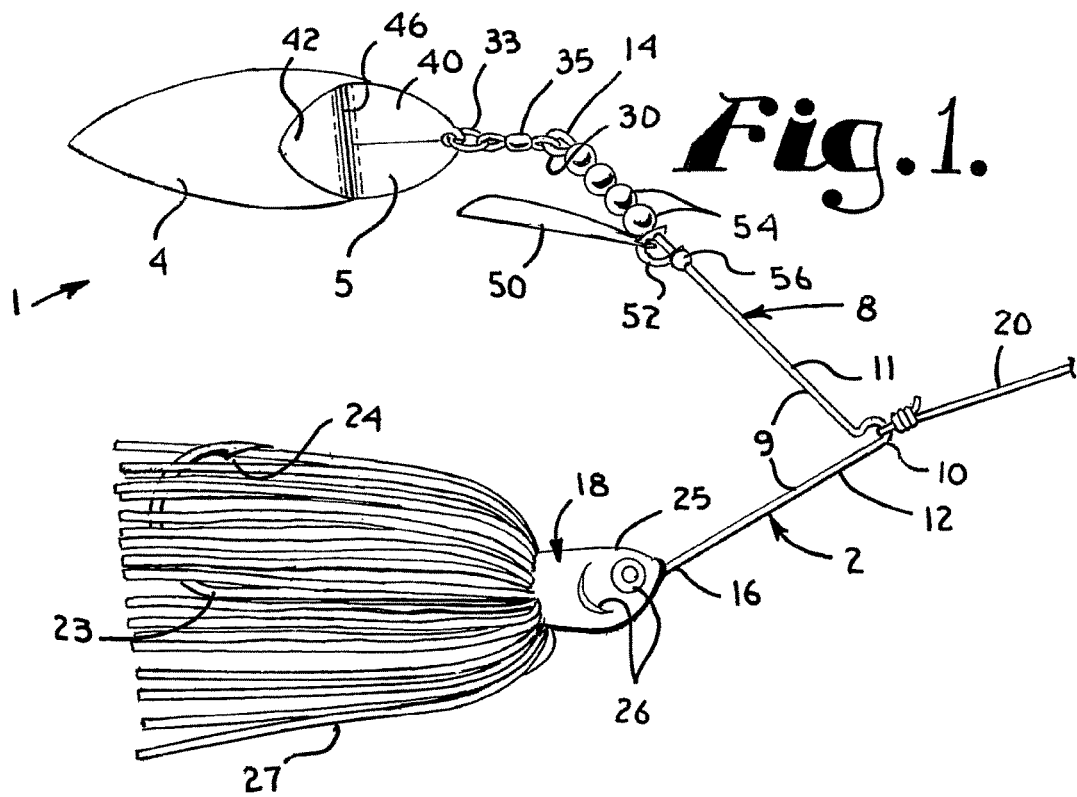
FIG. 1 is a side elevational view of a fishing lure incorporating interacting spinner blades according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of an improved lure apparatus according to the present invention. In general, the apparatus 1 includes a lure structure 2 having a pair of spinner blades or spinners 4 and 5 which are configured and mounted on the lure structure in such a manner as to interact during spinning motion when the lure structure is drawn through water to thereby enhance the attraction of fish to the apparatus.

The illustrated lure structure 2 includes a lure frame 8 formed by a wire 9 bent at a vertex or bend 10 to form an upper leg 11 and a lower leg 12. The angle between the upper leg 11 and lower leg 12 may be within a range of about 45° to 90°. In FIG. 1, the illustrated angle between the upper and lower legs is about 75°. The spinner blades 4 and 5 are connected to a rear end 14 of the upper leg 11, as will be described further below. A rear end 16 of the lower leg 12 has a weighted hook assembly 18 secured thereto. A fishing line 20 is typically connected to the lure frame 8 at the bend 10 to enable the apparatus 1 to be drawn through water. The illustrated lure apparatus 1 is of the type that is referred to as a "safety pin" style of lure because of the appearance of the bent wire frame 8. The apparatus 1 is also referred to as an overhead blade style spinnerbait since the weighted hook assembly 18 tends to assume a lower position relative to the spinner blades 4 and 5.

The lower leg 12 of the lure frame 8 angles downwardly and rearwardly from the bend 10 in the wire 9 and has the weighted hook assembly 18 secured to the rear end 16 of the lower leg 12. The illustrated weighted hook assembly 18 is formed by a fish hook 23 with a barb 24 which has a weight 25, such as a lead weight, secured to an end of the hook opposite the barb 24. The weight 25 may have features 26 formed thereon, such as eyes and or a gill slit, to give the assembly 18 the appearance of an aquatic animal. The assembly 18 may include a skirt 27 formed by filaments, feathers, or the like to complete the appearance of the assembly as a small animal. The skirt 27 surrounds the hook 23 and may provide some resistance to the hook snagging on weeds, underwater brush, and the like.

The upper leg 11 of the lure frame 8 angles upwardly and backwardly from the bend 10 of the wire 9. The spinner blades 4 and 5 are connected to the rear end 14 of the upper leg 11 in such a manner as to enable spinning motion of the blades when the apparatus 1 is drawn through water. In the illustrated apparatus 1, the rear end 14 has a loop 30 formed therein. The spinner blades 4 and 5 are both positioned on a connector ring 33. The ring 33 is connected to one end of a swivel 35 which is connected to the loop 30 at the rear end 14 of the upper leg 11. The swivel 35 is a conventional type of swivel device used in fishing tackle and enables the spinner blades 4 and 5 to rotate freely relative to the rear end 14 of the upper leg 11.

The spinner blade 4 is a conventional type of spinner used on spinnerbait types of lures. The blade 4 is somewhat cupped which causes the blade to spin when the lure apparatus 1 is drawn through water. The blade 4 may have a teardrop shape, referred to as a Colorado or Indiana blade depending on the proportions. Alternatively, the blade 4 may have a long, narrow shape, referred to as a willow or willowleaf blade. The illustrated spinner blade 4 is of a willowleaf shape. The blade 4 is typically larger than the blade 5.

Referring particularly to FIGS. 3 and 4, the illustrated spinner blade 5 is of a somewhat teardrop shape and includes a inner spinner blade segment 40 and an outer spinner blade segment 42. The inner segment 40 has an aperture 44 formed therethrough to receive the connector ring 33. The outer segment 42 joins the inner segment 40 at a linear bend 46, and the outer segment 42 is angled away from the inner segment 40. The angle between the outer segment 42 and the inner segment 40 may range from about 90° to 170°. An angular range about 120° to 150° is typical.

Because the blades 4 and 5 are secured on the same connector or ring 33, the blades 4 and 5 spin together, with the larger "driver" blade 4 providing a major portion of the spinning reaction. The angled orientation of the outer segment 42 causes the blade 5 to be periodically pivoted toward and away from the blade 4 when the lure 1 is drawn through water, as indicated by the arrow 48 in FIG. 3. Because of this, the blade 5 may be referred to as a "kicker" blade, since the blade 5 is periodically kicking against the blade 4. Engagement of the blade 5 with the blade 4 generates sound and vibrating currents in the water as the lure 1 is drawn therethrough and affects the spinning motion or the blade 4. The sound and currents generated, in addition to the flickering appearance of the spinning blades 4 and 5 is an attraction to various types of predatory fish which may motivate them to strike at the lure apparatus 1.

Figure 2:
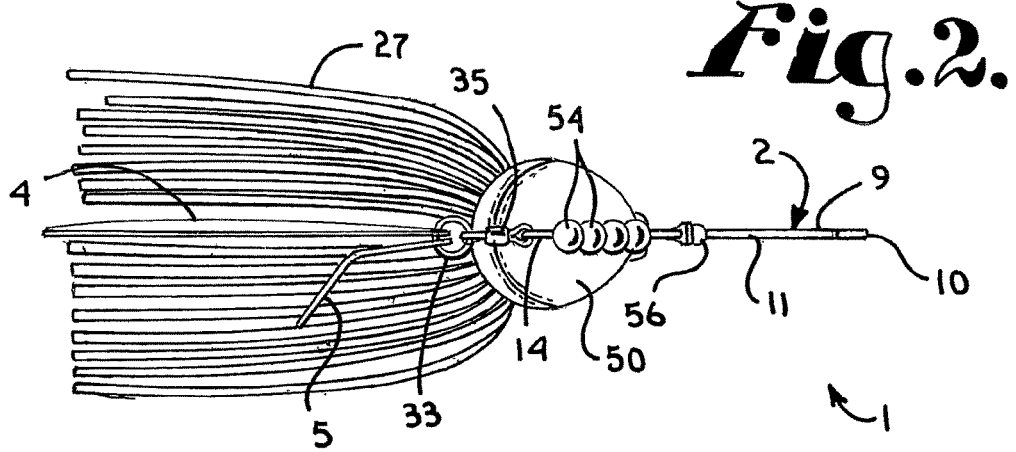
FIG. 2 is a top plan view of the lure illustrating features of the interacting spinner blades.

The lure apparatus 1 may have additional elements to attract the attention of fish. The illustrated apparatus 1 has an additional spinner blade 50 (FIGS. 1 and 2) which is mounted on the upper leg 11 of the lure frame 8. The blade 50 is referred to as a tandem blade because of its in-line relationship to the main spinner blades 4 and 5. The illustrated blade 50 is engaged with the upper leg 11 by a clevis 52 which enables the blade 50 and clevis 52 to spin about the leg 11. The blade 50 is spaced from the end 14 of the upper leg 11 by one or more spacer beads 54. The clevis 52 and beads 54 fit somewhat loosely on the upper leg 11 so that they may slide and pivot freely. The clevis 52 may be prevented from becoming entangled with the bend 10 of the wire 9 by a retainer bead 56.

Referring to FIG. 3, it is foreseen that the tandem blade 50 may be replaced with a combination of driver blade 4 and kicker blade 5 connected to the clevis 52 along the upper leg 11 and spaced from the end 14. In such an arrangement, the actions of the blades 4 and 5 are similar to the actions of the blades 4 and 5 secured by a ring 33 and swivel 35 to the loop 30 at the end 14 of the leg 11, with the driver blade 4 providing most of the spinning reaction to being drawn through water and the kicker blade 5 periodically engaging the blade 4 to generate sounds and currents and to affect the spinning motion of the blade 4. It is foreseen that the apparatus 1 can be provided with a set of blades 4 and 5 can mounted by a clevis 52 on the upper leg 11 in combination with a set of blades 4 and 5 connected by a swivel 35 to the end 14 of the leg 11 or, alternatively, with out a set of blades 4 and 5 connected to the end 14.

It is to be understood that while certain forms of the present invention have been described and illustrated herein, it is not to be limited to the specific forms or arrangement of parts described and shown.

What is claimed and desired to be secured by Letters Patent is:

1. A fishing lure apparatus comprising:
   a) a lure structure;
   b) a first spinner blade member connected to the lure structure to enable spinning motion thereof when the lure structure is drawn through water; the first spinner blade member is curved so as to have a concave side and a convex side; the first spinner blade member being joined to a remainder of the lure structure only at a first end of the first spinner blade member;
   c) a second spinner blade member joined to the remainder of the lure structure only at a first end of the second spinner blade member; the second spinner blade member being connected to the lure structure and being sized, shaped, and positioned relative to the first spinner blade member whereby movement of the second spinner blade member when the lure structure is drawn through water causes the second spinner blade member to sporadically kick against the first spinner blade member so as to modify the movement of the first spinner blade member with each kick; and
   d) a clevis connector member rotatably connected to the lure structure in such a manner as to enable rotation of the clevis connector member relative to the lure structure, the first end of the first spinner blade member and the first end of the second spinner blade member are both retained on the clevis connector member, an intermediate portion of the clevis connector member extending through an aperture formed in each of the first and second spinner blade members.

2. The apparatus as set forth in claim 1 wherein:
   (a) the second spinner blade member is positioned on the lure structure in such a manner relative to the first spinner blade member as to periodically engage the first spinner blade member when the lure structure is drawn through water to thereby affect the spinning motion of the first spinner blade member.

3. The apparatus as set forth in claim 1 wherein:
   (a) the second spinner blade member is positioned on the lure structure in such a manner relative to the first spinner blade member as to periodically engage the first spinner blade member when the lure structure is drawn through water to thereby create noise.

4. The apparatus as set forth in claim 1 wherein:
   (a) the second spinner blade member is positioned on the lure structure in such a manner relative to the first spinner blade member as to periodically engage the first spinner blade member when the lure structure is drawn through water to thereby create vibrating currents in such water.

5. The apparatus as set forth in claim 1 wherein:
   (a) the second spinner blade member has a second end opposite the second spinner blade member first end and is angularly bent to form a bend approximately between the second spinner blade member first and second ends.

6. The apparatus as set forth in claim 1 wherein:
   (a) the second spinner blade member is angularly bent to form an inner spinner segment and an outer spinner segment, the inner spinner segment being connected to the lure structure; and
   (b) the outer spinner segment is positioned at a bend angle within an angular range of 90 to 170 degrees relative to the inner spinner segment and such that the bend periodically engages the first spinner blade member.

7. The apparatus as set forth in claim 1 wherein: the second spinner blade member is angularly bent away from the concave side of the first spinner blade member.

8. The apparatus as set forth in claim 1 and including:
   (a) a hook secured to the lure structure.

9. A fishing lure apparatus comprising:
   (a) a lure frame including an elongate wire;
   (b) a hook secured to the lure frame at a first end of the frame;
   (c) a connector member rotatably connected to the lure frame at a second end of the frame in such a manner as to enable rotation of the connector member relative to the lure frame;
   (d) a first spinner blade member retained on the connector member at a first end of the first spinner blade member to enable spinning motion thereof; and
   (e) a second spinner blade member retained at a first end of the second spinner blade member on the connecter member with adjacent the first spinner blade member whereby movement of the second spinner blade member engages and kicks into the first spinner blade member periodically during use so as to affect the spinning motion of the first spinner blade member when the lure frame is drawn through water;
   wherein the first end of the first spinner blade member and the first end of the second spinner blade member are both retained on the connector member, an intermediate portion of the connector member extending through an aperture formed in each of the first and second spinner blade members.

10. The apparatus as set forth in claim 9 wherein:
    (a) the second spinner blade member is retained on the connector member in such a manner relative to the first spinner blade member as to periodically engage the first spinner blade member when the lure frame is drawn through water to thereby create noise.

11. The apparatus as set forth in claim 9 wherein:
    (a) the second spinner blade member is retained on the connector member in such a manner relative to the first spinner blade member as to periodically engage the first spinner blade member when the lure frame is drawn through water to thereby create vibrating currents in such water.

12. The apparatus as set forth in claim 9 wherein:
    (a) the second spinner blade member is angularly bent at a location spaced from the second spinner blade member first end.

13. The apparatus as set forth in claim 9 wherein:
    (a) the second spinner blade member is angularly bent so as to form a bend and to create an inner spinner segment and an outer spinner segment, the inner spinner segment being retained on the connector member; and
    (b) the outer spinner segment is positioned at a bend angle within an angular range of 90 to 170 degrees relative to the inner spinner segment.

14. The apparatus as set forth in claim 9 wherein:
(a) the first spinner blade member has a convex side and an opposite concave side;
(b) the second spinner blade member is positioned on the concave side of the first spinner blade member; and
(c) the second spinner blade member is angularly bent away from the concave side of the first spinner blade member and the bend periodically engages the concave side of the first spinner blade member.

15. The apparatus as set forth in claim 9 wherein:
(a) the connector member includes a ring.

16. The apparatus as set forth in claim 9 wherein:
(a) the connector member includes a swivel.

17. The apparatus as set forth in claim 9 wherein:
(a) the connector member includes a clevis.

18. A fishing lure apparatus comprising:
(a) a lure frame including an elongate wire having first and second ends;
(b) a hook secured to the lure frame at the wire first end;
(c) a connector member rotatably connected to the lure frame at the wire second end in such a manner as to enable rotation of the connector member relative to the lure frame;
(d) an elongate first spinner blade member retained at a first end of the first spinner blade member on the connector member to enable spinning motion thereof, the first spinner blade member having a convex side and an opposite concave side;
(e) an elongate second spinner blade member retained on the connecter member at a first end of the second spinner blade member and adjacent to the first spinner blade member, the second spinner blade member being angularly bent at a bend spaced from the first end of the second spinner blade member so as to form an inner spinner segment and an outer spinner segment, the inner spinner segment being retained on the connector member;
(f) the second spinner blade member being retained on the connector member on the concave side of the first spinner blade member with the second spinner segments angled away from the concave side of the first spinner blade member; and
(g) the first spinner blade member and the second spinner blade member cooperating whereby the second spinner blade member periodically engages and kicks against the first spinner blade member when the lure frame is drawn through water to thereby affect the spinning motion of the first spinner blade member;
(h) wherein the first end of the first spinner blade member and the first end of the second spinner blade member are both retained on the connector member, an intermediate portion of the connector member extending through an aperture formed in each of the first and second spinner blade members.

19. The apparatus as set forth in claim 18 wherein:
(a) the outer spinner segment is positioned at a bend angle within an angular range of 90 to 170 degrees relative to the inner spinner segment.

20. The apparatus as set forth in claim 18 wherein:
(a) the connector member includes a ring.

21. The apparatus as set forth in claim 18 wherein:
(a) the connector member includes a swivel.

22. The apparatus as set forth in claim 18 wherein:
(a) the connector member includes a clevis.

* * * * *